(12) United States Patent
Takeda

(10) Patent No.: US 6,732,825 B2
(45) Date of Patent: May 11, 2004

(54) TOWING TRACTORS

(75) Inventor: Mitsumasa Takeda, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 09/928,275

(22) Filed: Aug. 10, 2001

(65) Prior Publication Data

US 2002/0017407 A1 Feb. 14, 2002

(30) Foreign Application Priority Data

Aug. 11, 2000 (JP) ........................ 2000-245148

(51) Int. Cl.[7] .................. B60R 16/04; B62D 25/00
(52) U.S. Cl. .................. 180/68.5; 180/89.12; 180/312; 280/783
(58) Field of Search ................ 180/68.5, 65.1, 180/89.12, 311, 312, 907; 280/163, 164.1, 166, 783, 785

(56) References Cited

U.S. PATENT DOCUMENTS

| | | | | | |
|---|---|---|---|---|---|
| 1,411,875 | A | * | 4/1922 | Schroeder | 280/783 |
| 3,667,563 | A | * | 6/1972 | Korb et al. | 180/68.5 |
| 3,704,761 | A | * | 12/1972 | Barrett, Jr. | 180/68.5 |
| 3,821,997 | A | * | 7/1974 | Sieren | 180/68.5 |
| 4,033,424 | A | * | 7/1977 | Evans | 180/68.5 |
| 4,074,786 | A | * | 2/1978 | Joubert | 180/68.5 |
| 4,317,497 | A | * | 3/1982 | Alt et al. | 180/68.5 |
| 4,342,470 | A | * | 8/1982 | Matsuda | 280/785 |
| 4,429,761 | A | * | 2/1984 | Haddock, Jr. et al. | 180/271 |
| 4,584,815 | A | * | 4/1986 | Haven et al. | 52/327 |
| 4,696,508 | A | * | 9/1987 | Brautigam | 296/65.1 |
| 4,779,692 | A | * | 10/1988 | Hagarty et al. | 180/68.5 |
| 4,834,424 | A | * | 5/1989 | Link | 280/785 |
| 4,898,419 | A | * | 2/1990 | Kenmochi et al. | 296/204 |
| 5,114,207 | A | * | 5/1992 | Nakajima et al. | 296/204 |
| 5,228,531 | A | * | 7/1993 | Patterson et al. | 180/68.5 |
| 5,297,645 | A | * | 3/1994 | Eckersley et al. | 180/68.5 |
| 5,593,167 | A | * | 1/1997 | Barnhardt et al. | 280/164.1 |
| 5,709,280 | A | * | 1/1998 | Beckley et al. | 180/68.5 |
| 6,029,762 | A | * | 2/2000 | Kepner | 180/65.1 |
| 6,173,799 | B1 | * | 1/2001 | Miyazaki et al. | 180/19.3 |
| 6,189,636 | B1 | * | 2/2001 | Kikukawa | 180/68.5 |
| 6,474,429 | B1 | * | 11/2002 | Nishio | 180/68.5 |
| 6,528,899 | B1 | * | 3/2003 | Saito et al. | 307/10.1 |

FOREIGN PATENT DOCUMENTS

| | | | |
|---|---|---|---|
| JP | 7-5868 | 1/1995 | ............ B60K/1/04 |
| JP | 10-129491 | 5/1998 | |

* cited by examiner

Primary Examiner—Brian L. Johnson
Assistant Examiner—Bridget Avery
(74) Attorney, Agent, or Firm—Morgan & Finnegan, LLP

(57) ABSTRACT

The object of the present teachings is to provide an improved battery-operated towing tractor. A representative towing tractor is operated by means of battery and the battery may be installed to and removed from the battery storage chamber of the towing tractor by using an opening disposed at the side surface of the battery storage chamber. Because the battery is installed and removed through the side surface of the battery storage chamber, the tractor surface can be effectively used.

21 Claims, 4 Drawing Sheets

TOWING TRACTORS

BACKGROUND OF THE INVENTION

1. Technical Field

The present invention relates to towing tractors operated by battery and to towing tractors that may preferably be used for towing a trailer.

2. Description of the Related Art

Known battery-operated towing tractor is disclosed in unexamined Japanese utility model publication H7-5868 and includes a battery storage chamber that extends from the center to the rear of the vehicle. The battery storage chamber has a box structure with an opening on the top surface of the battery storage chamber. A battery case that contains a plurality of battery cells is received in the battery storage chamber. In order to replace the batteries, the battery case is lifted upward by utilizing a crane. On the other hand, the towing tractor requires relatively large space on its top surface for the operating person of the tractor and for providing switches and levers to operate the tractor.

SUMMARY OF THE INVENTION

It is an object of the present invention to provide an improved battery-operated towing tractor. A towing tractor according to the present teachings is operated by a battery and the battery may be installed to and removed from the battery storage chamber of the towing tractor by using an opening disposed at the side surface of the battery storage chamber. Because the battery is installed and removed through the side surface of the battery storage chamber, the tractor surface can be effectively used.

Other objects, features and advantages of the present invention will be readily understood after reading the following detailed description together with the accompanying drawings and the claims.

DETAILED DESCRIPTION OF THE INVENTION

Figure 1:
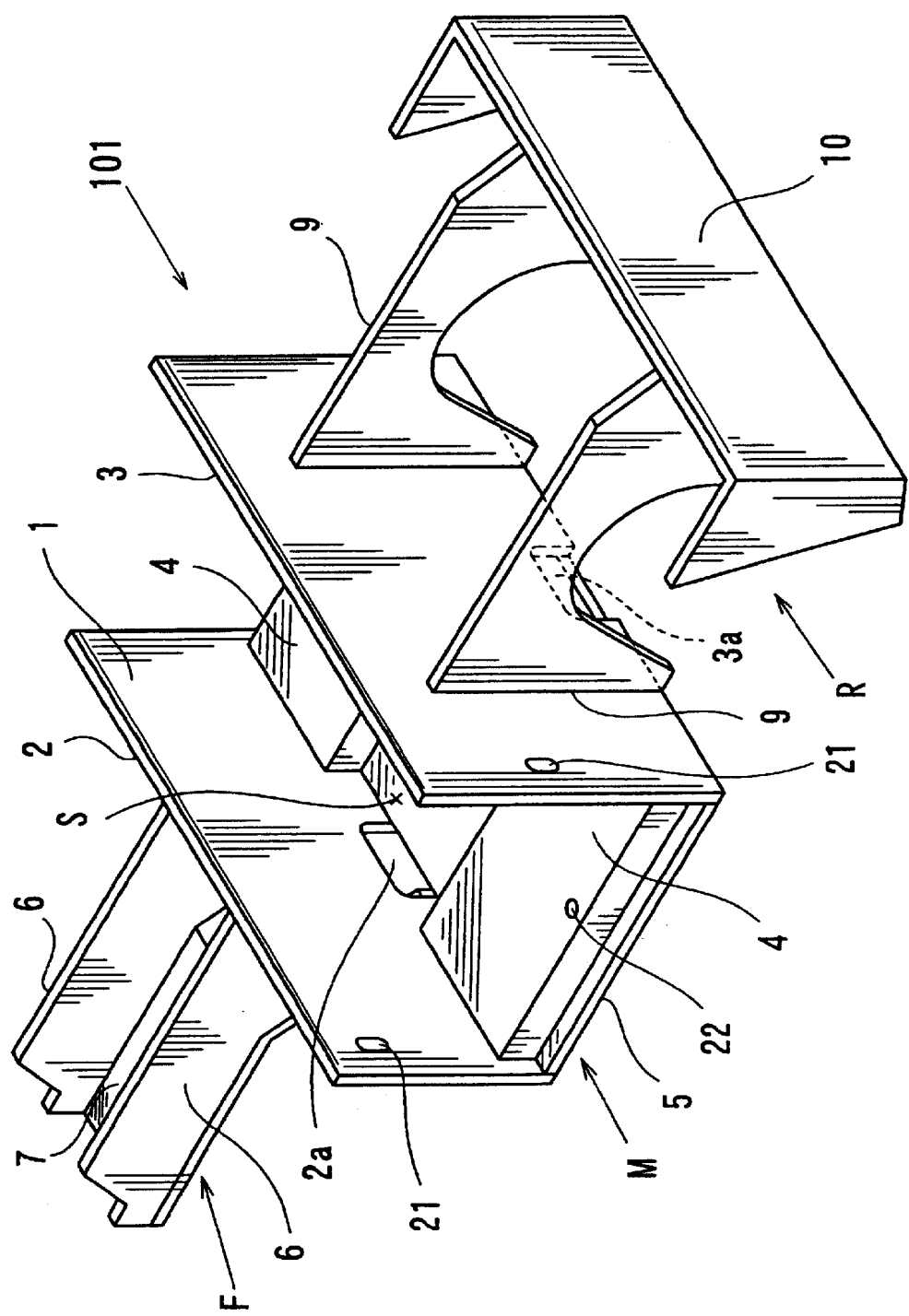
FIG. 1 shows a perspective view of the body frame of the representative towing tractor.

A representative towing tractor is operated by means of a battery and may preferably include a body frame and a battery storage chamber. The battery storage chamber is formed within the body frame so as to storage the battery within the towing tractor. Preferably, the battery may include a plurality of battery cells. The battery storage chamber may include an opening and the opening may be provided on the side surface of the battery chamber in order to install the battery to the battery storage chamber and to remove the battery from the battery storage chamber.

Preferably, the body frame may include front, mid and rear frames and the battery storage chamber may be provided within any one of the frames. More preferably, the battery chamber may be provided within the mid frame. The front frame, mid frame and the rear frame can be separated with each other by first and second walls. The first wall may be located at the rear end of the front frame and the second wall may be located at the front end of the rear frame. Preferably, the battery storage chamber may extend between the first and second walls.

Further, the bottom surface of the battery storage chamber may have a space that extends between the front and rear portions of the body frame. The space of the battery storage chamber may receive wire harness. Preferably, the wire harness may connect electrical instruments disposed at the front portion of the towing tractor with electrical instruments disposed at the rear portion.

Moreover, the battery storage chamber may preferably include an opening on the top surface of the battery storage chamber in addition to the opening on the side surface. The battery replacement can be performed to selectively utilize one of two types of the openings in accordance with the work environment. Preferably, the opening on the top surface and the opening on the side surface may be defined by a single opening.

Each of the additional features and method steps disclosed above and below may be utilized separately or in conjunction with other features and method steps to provide improved towing tractor and methods for designing and using such towing tractor. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

FIG. 1 shows a body frame 101 of the representative towing tractor. The body frame 101 is integrally constructed by welding steel plates and includes three sections, i.e., a front frame F, a mid frame M, and a rear frame R. The mid frame includes a battery storage chamber 1.

The battery storage chamber 1 is mainly defined by a front vertical plate 2, a rear vertical plate 3, left and right bottom plates 4. Each bottom plate 4 extends between the vertical plates 2 and 3. Both the vertical plates 2, 3 and the bottom plates 4 are made by steel plate. The cross-section of the bottom plate 4 is in U-shape in order to increase the strength of the body frame 101. The mid frame M includes an under-plate 5 that defines the bottom surface of the battery storage chamber 1. The under-plate 5 is surrounded by the bottom plates 4 and the front and rear vertical plates 2 and 3.

The front frame F includes a pair of side front members 6 and a plate 7. The side front members 6 and the plate 7 are made by thick steel plate. The side front members 6 are aligned in parallel with predetermined intervals with respect to the direction of the vehicle width. The plate 7 connects one front side member 6 with another front side member 6. Although it is not particularly shown in the drawings, a front axle is installed in the lower center of the front frame F and the front axle is supported by a suspension. Further, a bumper 8 (see FIG. 2) is coupled to the front edge portion of the front frame F.

The rear frame R includes left and right rear side members 9, and a rear cross member 10. Both rear side members 9 and the rear cross member 10 are made by thick steel plates. The left and right rear side members 9 are aligned in parallel with predetermined intervals with respect to the direction of the vehicle width. The rear cross member 10 connects the rear side members 9 with each other. Although it is not particularly shown in the drawings, a rear axle is rigidly coupled to the rear frame R. Further, a towing device 11 (see FIGS. 2 and 3) is installed in the center of the rear surface of the rear cross member 10. Thus, the frames of the representative towing tractor 100 can maintain required strength to the towing tractor.

Figure 2:
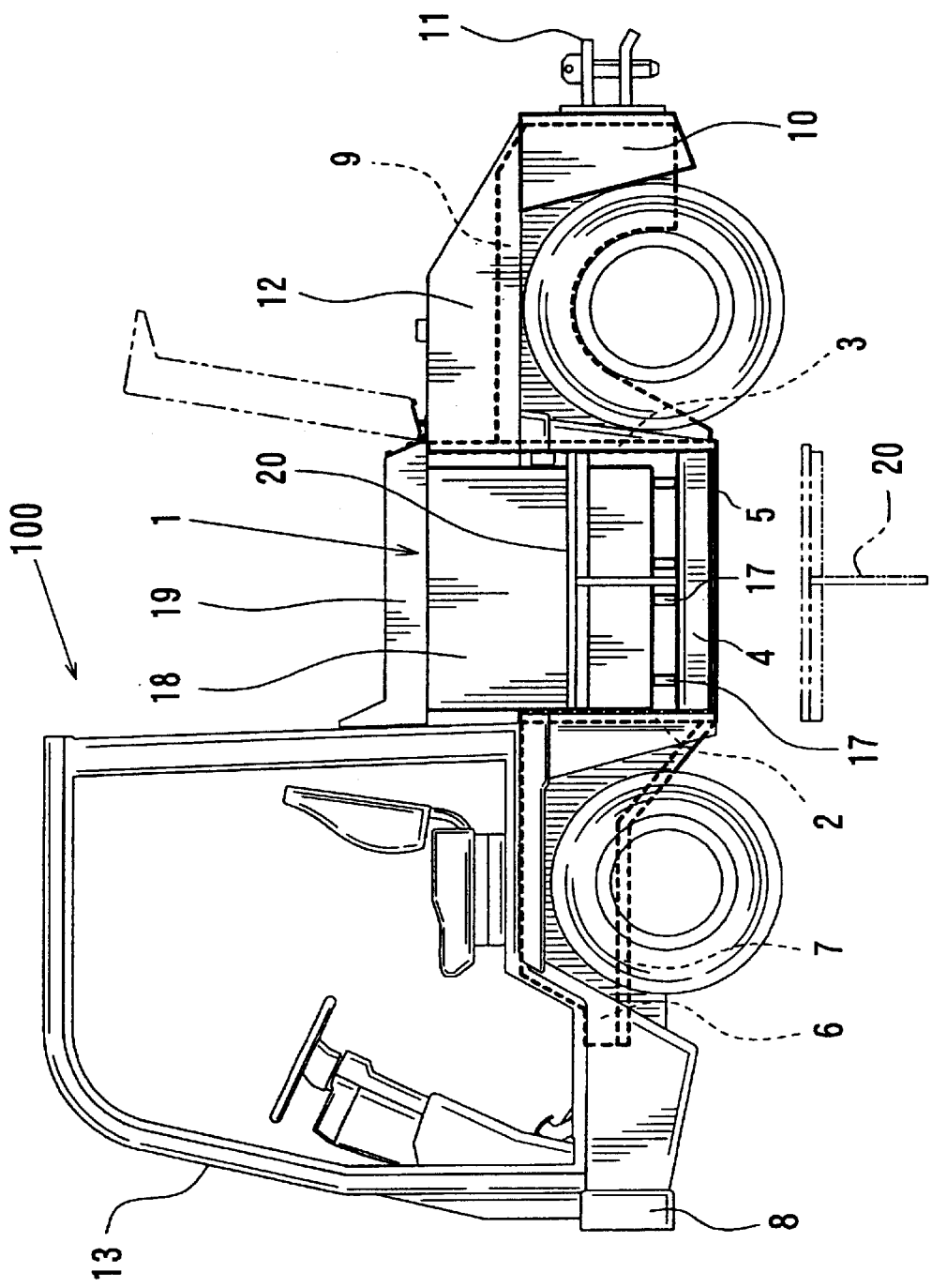
FIG. 2 shows a side view of the towing tractor according to the representative embodiment.
Figure 3:
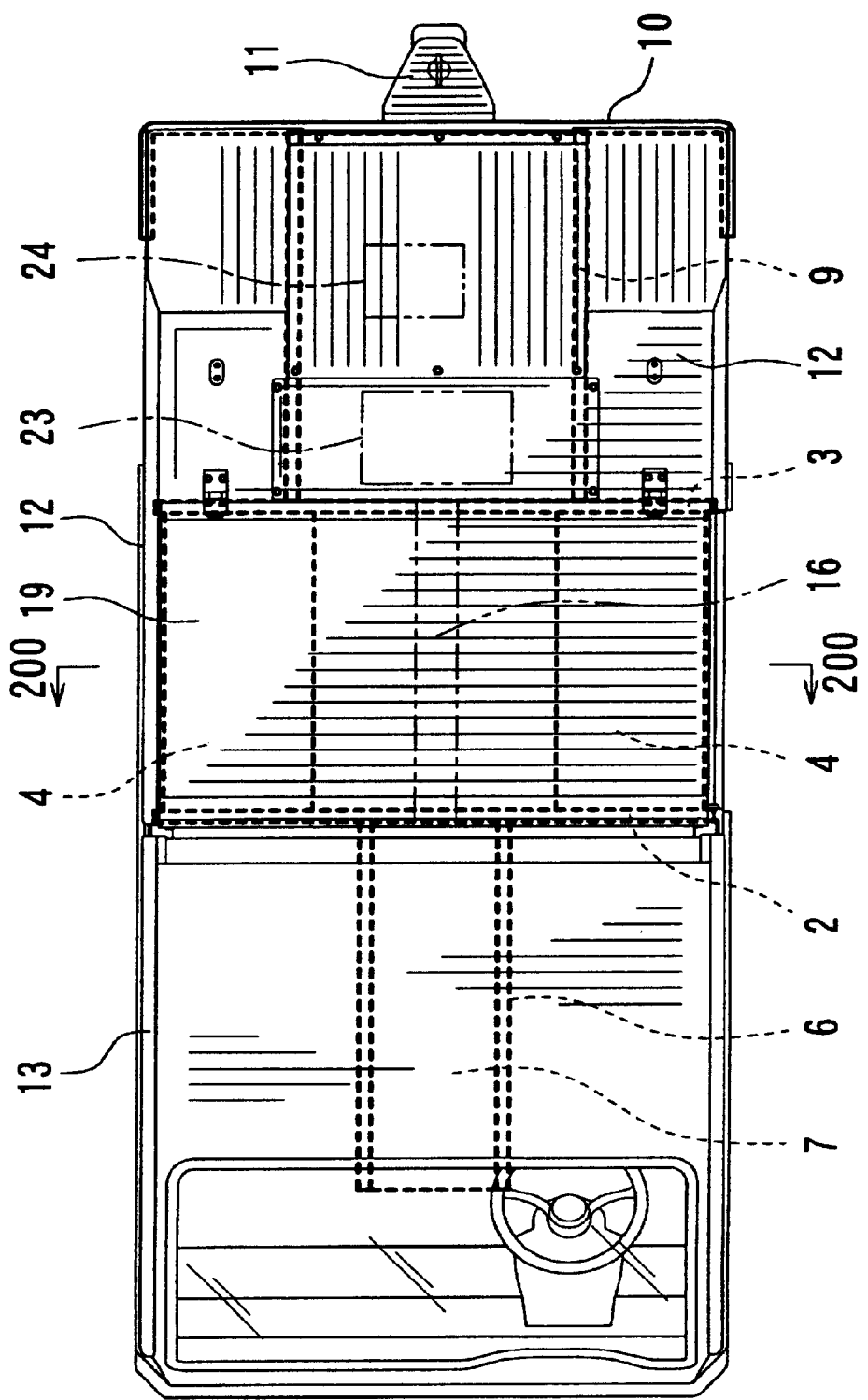
FIG. 3 shows a top view of the towing tractor according to the representative embodiment.

The representative towing tractor 100 that includes the body frame 101 is shown in FIG. 2. As it is shown in FIG. 2 and FIG. 3, one of the side surfaces of the mid frame M, as well as the top and side surfaces of the rear frame R are respectively covered by steel panel 12. A cabin 13 for the operator is disposed on the top of the front frame F.

Figure 4:
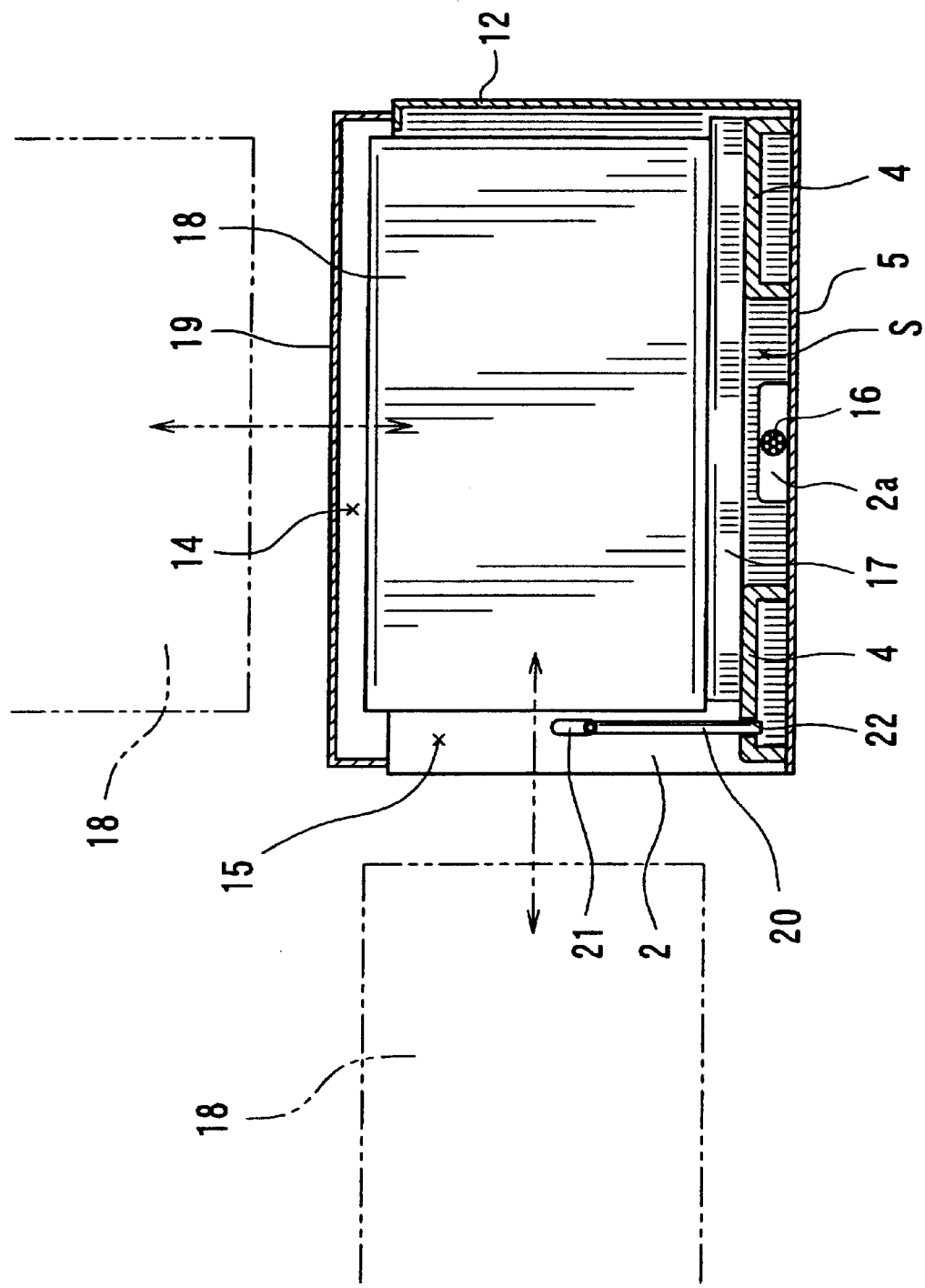
FIG. 4 shows a cross-sectional view of the towing tractor along line 200—200 in FIG. 3.

As it is shown in FIG. 4, the battery storage chamber 1 includes front and rear walls, a floor, right-side wall. The front and rear walls is defined by the front and rear vertical plates 2 and 3. The floor is defined by the left and right bottom plates 4 and the under-plate S. The right-side wall is defined by the panel 12. Thus, the battery storage chamber 1 has openings 14 and 15 defined by the top surface and the left-side surface of the towing tractor 100, respectively. The openings 14 and 15 may be utilized for replacing the battery.

The battery storage chamber 1 has a space S between the left and right bottom plates 4. The wire harness 16 is provided within the space S. As it is shown in FIG. 3, the wire harness 16 connects the battery with the controller 23, the driving motor 24 and another various electrical instruments of the towing tractor 100. In this connection, as it is shown in FIG. 1, holes 2a and 3a are provided to correspond to the space S in the lower edges of front and rear vertical plates 2 and 3. And the wire harness 16 extends from the mid frame M to the front frame F and to the rear frame R through the holes 2a and 3a. Further, as it is shown in FIG. 4, rail-shaped platforms 17 are provided on the top surface of bottom plate 4. The platforms 17 extend in the direction of the width of the towing tractor 100. A battery case 18 is disposed on the platforms 17 and the battery case 18 includes a large number of battery cells. As it is particularly shown in FIG. 2, the bottom surface of the battery case 18 and the platforms 17 define spaces for allowing the forks of the forklift to be inserted thereto when the battery is replaced.

As it is shown in FIG. 4, the opening 14 on the top surface of battery storage chamber 1 is covered by a battery hood 19. The battery hood 19 opens and closes the opening 14. A T-shaped bar 20 (See FIG. 2) is provided within the opening 15 on the side surface of the battery storage chamber 1. The bar 20 prevents the battery case 18 within the battery storage chamber 1 from accidentally falling out. The bar 20 is supported by installation holes. As it is shown in FIG. 1, the front and rear vertical plates 2 and 3 includes installation holes 21, respectively. And the left-side bottom plate 4 includes installation hole 22 on its top surface. Thus, the bar 20 can be supported at three points. The height of the installation hole 21 measured in the longitudinal direction on each vertical plates 2,3 is longer than the width thereof measured it the horizontal direction. As the result, the bar 20 can be easily inserted into and extracted from the installation hole 22 by utilizing the installation hole 21 as a guide member.

According to the representative embodiment, the openings 14 and 15 can be used for inserting and removing batteries, respectively. Because the opening 14 is provided on the top surface of the battery storage chamber 1, the battery case 18 can be lifted up by utilizing a crane through the opening 14 for the replacement. Further, because the opening 15 is provided on the left-side surface of the battery storage chamber 1, the battery case 18 can be horizontally extracted by utilizing a forklift when the T-shaped bar 20 is detached. That is, the battery case 18 can be installed and extracted in the longitudinal or horizontal direction and thus, battery replacement can be performed in accordance with the work environment. For example, when there is a restriction on the space above the tractor, battery case 18 can be replaced from the side surface of the tractor by using a forklift, and when there is a restriction on the space to the side of the tractor, the battery case 18 can be replaced from the top surface of the tractor by using a crane.

With respect to the bar 20 for preventing battery case 18 from falling out through the opening 15, the shape of the bar can be selected from various shapes. Further, instead of the insertion system of the bar 20 into the installation hole, a rotating arm can be adopted that can swing between the first position where the battery case can be released from the battery storage chamber and the second position where the battery case is prohibited from being released from the battery storage chamber. Further, the fall-out prevention member can be installed on the battery case 18 instead of installing on the opening 15. With respect to the rail-shaped platform 17, a roller or slider that can ease the movement of the battery case 18 may preferably be adapted. Moreover, wire harness 16 to be installed in space S between bottom plates 4 may preferably be covered by a cover.

What is claimed is:

1. A towing tractor operated by a battery comprising:
   a body frame, the body frame includes front, mid and rear frames, wherein the front frame, mid frame and the rear frame are separated with each other by first and second walls, the first wall is located at the rear end of the front frame and the second wall is located at the front end of the rear frame,
   a battery storage chamber for storing the battery, wherein the battery storage chamber is formed within the body frame in any one of the front, mid and rear frames, the battery storage chamber having an opening adapted to install the battery to the battery storage chamber and to remove the battery from the battery storage chamber, wherein the opening is provided on the side surfaces of the battery storage chamber and the battery includes a plurality of battery cells.

2. The towing tractor according to claim 1, wherein the battery storage chamber extends between the first and second walls.

3. The towing tractor according to claim 1, wherein the battery storage chamber further includes an opening on the top surface of the battery storage chamber.

4. The towing tractor according to claim 1, wherein the battery is defined by a battery case that includes the battery cells, the body frame includes front, mid and rear frames and the battery storage chamber is provided within a space defined by the mid frame, the battery storage chamber further includes an opening on the top surface of the battery storage chamber and the opening on the top surface is connected with the opening on the side surface of the battery storage chamber.

5. The towing tractor according to claim 3, wherein the opening on the top surface and the opening on the side surface are defined by a single opening.

6. A towing tractor operated by a battery comprising:

a body frame, the body frame includes front, mid and rear frames, wherein the front frame, mid frame and the rear frame are separated with each other by first and second walls, the first wall is located at the rear end of the front frame and the second wall is located at the front end of the rear frame, a battery storage chamber for storing the battery, wherein the battery storage chamber is formed within the body frame in any one of the front, mid and rear frames, the battery storage chamber having an opening adapted to install the battery to the battery storage chamber and to remove the battery from the battery storage chamber, wherein the opening is provided on the side surfaces of the battery storage chamber, and a stopper to prevent the battery from falling out from the battery storage chamber through the opening, wherein the stopper is defined by a bar that is removably installed into an installation hole provided near the opening.

7. A towing tractor operated by a battery comprising:

a body frame, the body frame includes front, mid and rear frames, wherein the front frame, mid frame and the rear frame are separated with each other by first and second walls, the first wall is located at the rear end of the front frame and the second wall is located at the front end of the rear frame, a battery storage chamber for storing the battery, wherein the battery storage chamber is formed within the body frame in any one of the front, mid and rear frames, the battery storage chamber having an opening adapted to install the battery to the battery storage chamber and to remove the battery from the battery storage chamber, wherein the opening is provided on the side surfaces of the battery storage chamber, wherein the bottom surface of the battery storage chamber has a space extending between front and rear portions of the body frame, the space receives a wire harness that connects electrical instruments disposed at the front and rear portions, respectively.

8. A battery-powered towing tractor comprising:

a battery, the battery comprises a plurality of battery cells disposed within a battery case, wherein a space for inserting a fork of a forklift is defined within a bottom surface of the battery case;

a body frame;

an electrically-driven motor supported by the body frame and electrically coupled to the battery;

a battery storage chamber defined within the body frame and supporting the battery, the battery storage chamber having a side opening defined on a side surface of the body frame, the side opening being arranged and constructed so that the battery is removable from the battery storage chamber in a substantially horizontal direction, and an upper opening defined on an upper surface of the body frame, the upper opening being arranged and constructed so that the battery is removable from the battery storage chamber in a substantially vertical direction; and a battery hood pivotally coupled to the body frame and being arranged and constructed to open and close the upper opening.

9. A battery-powered towing tractor as in claim 8, wherein the side and upper openings are contiguous.

10. A battery-powered towing tractor as in claim 8, further comprising a wire harness disposed within a space defined below the battery storage chamber, the wire harness electrically coupling the battery to the electrically-driven motor.

11. A battery-powered towing tractor as in claim 8, wherein the body frame comprises a front frame, a mid frame and a rear frame and the battery storage chamber is defined within the mid frame.

12. A battery-powered towing tractor as in claim 8, further comprising a stopper removably disposed within the side opening, the stopper preventing the battery from dislodging from the battery storage chamber during operation.

13. A battery-powered towing tractor as in claim 8, wherein the battery storage chamber is fixedly defined within the body frame.

14. A battery-powered towing tractor as in claim 11, wherein the rear frame supports the electrically driven motor and the front frame supports a passenger cabin.

15. A battery-powered towing tractor as in claim 11, further comprising a first wall separating the front frame from the mid frame and a second wall separating the mid frame from the rear frame.

16. A battery-powered towing tractor as in claim 12, wherein the stopper comprises a bar removably installed within an installation hole defined within the body frame.

17. A battery-powered towing tractor as in claim 15, wherein the battery storage chamber is defined in part by the first wall and the second wall.

18. A battery-powered towing tractor comprising:

a plurality of battery cells disposed within a battery case;

a body frame comprising a front frame, a mid frame and a rear frame;

an electrically-driven motor supported by the rear frame and electrically coupled to the battery cells;

a battery storage chamber fixedly defined within the mid frame and supporting the battery case, the battery storage chamber having a side opening defined on a side surface of the mid frame, the side opening being arranged and constructed so that the battery case is removable from the battery storage chamber in a substantially horizontal direction, and an upper opening defined on an upper surface of the mid frame, the upper opening being arranged and constructed so that the battery case is removable from the battery storage chamber in a substantially vertical direction, wherein the side and upper openings are contiguous and a space for inserting a fork of a forklift is defined within a bottom surface of the battery case;

a battery hood pivotally coupled to the mid frame and being arranged and constructed to open and close the upper opening;

a wire harness disposed within a space defined between the battery storage chamber and the mid frame, the wire harness electrically coupling the battery cells to the electrically-driven motor; and a bar removably disposed within an installation hole defined proximal to the side opening, the bar preventing the battery case from dislodging from the battery storage chamber during operation.

19. A battery-powered towing tractor as in claim 18, further comprising a passenger cabin supported by the front frame.

20. A battery-powered towing tractor as in claim 19, further comprising a first wall separating the front frame from the mid frame and a second wall separating the mid frame from the rear frame.

21. A battery-powered towing tractor as in claim 20, wherein the battery storage chamber is defined in part by the first wall and the second wall.

\* \* \* \* \*

UNITED STATES PATENT AND TRADEMARK OFFICE
CERTIFICATE OF CORRECTION

PATENT NO.   : 6,732,825 B2
DATED        : May 11, 2004
INVENTOR(S)  : Takeda

It is certified that error appears in the above-identified patent and that said Letters Patent is hereby corrected as shown below:

Column 3,
Line 23, please delete "under-plate S" and insert therefore -- under-plate 5 --.

Signed and Sealed this

Thirty-first Day of August, 2004

JON W. DUDAS
*Director of the United States Patent and Trademark Office*